US012407991B2

(12) United States Patent
Hernvig et al.

(10) Patent No.: US 12,407,991 B2
(45) Date of Patent: Sep. 2, 2025

(54) SET OF HEARING DEVICES WITH MUTUAL SETTING BACKUP DATA

(71) Applicant: GN Hearing 2 A/S, Ballerup (DK)

(72) Inventors: Lotte Hagen Hernvig, Copenhagen S (DK); David Laundav, Rødovre (DK); Edgars Raudive, Herlev (DK); Ulla Rixen, Vedbæk (DK); Priya Thomas, Valby (DK); Hong Liu, Værløse (DK)

(73) Assignee: GN Hearing 2 A/S, Ballerup (DK)

( * ) Notice: Subject to any disclaimer, the term of this patent is extended or adjusted under 35 U.S.C. 154(b) by 131 days.

(21) Appl. No.: 18/102,542

(22) Filed: Jan. 27, 2023

(65) Prior Publication Data

US 2024/0259737 A1 Aug. 1, 2024

(51) Int. Cl.
*H04R 25/00* (2006.01)

(52) U.S. Cl.
CPC .................................. *H04R 25/505* (2013.01)

(58) Field of Classification Search
CPC .. H04R 25/505; H04R 25/554; H04R 25/558; H04R 25/552
See application file for complete search history.

(56) References Cited

U.S. PATENT DOCUMENTS

| | | | |
|---|---|---|---|
| 3,221,100 A | 11/1965 | Phillip | |
| 4,060,701 A | 11/1977 | Epley | |
| 10,341,790 B2 | 7/2019 | Shennib | |
| 10,455,337 B2 | 10/2019 | Yoo | |
| 2005/0033193 A1 | 2/2005 | Wasden et al. | |
| 2009/0156959 A1 | 6/2009 | Thornton et al. | |
| 2010/0137739 A1 | 6/2010 | Lee et al. | |
| 2012/0029383 A1 | 2/2012 | Henriksen et al. | |
| 2012/0148054 A1 | 6/2012 | Rank et al. | |
| 2015/0358745 A1 | 12/2015 | Rix et al. | |
| 2024/0259740 A1 * | 8/2024 | Käsbach et al. | H04R 25/70 |

FOREIGN PATENT DOCUMENTS

| | | |
|---|---|---|
| CN | 106073797 | 11/2016 |

OTHER PUBLICATIONS

Non-Final Office Action for U.S. Appl. No. 18/101,848 dated Dec. 23, 2024.
Non-Final Office Action for U.S. Appl. No. 18/101,848 dated dated May 20, 2025.
Non-Final Office Action for U.S. Appl. No. 18/102,614 dated Jul. 9, 2025.

* cited by examiner

*Primary Examiner* — Tuan D Nguyen
(74) *Attorney, Agent, or Firm* — Vista IP Law Group, LLP

(57) ABSTRACT

A set of hearing devices comprising a first hearing device adapted to be worn at a first ear of a user and a second hearing device adapted to be worn at a second ear of the user, each of the first and second hearing devices comprising: an output transducer, a wireless communication interface, a processing unit, and a memory unit, wherein the memory unit of the first hearing device comprises first setting data associated with user settings of the first hearing device, wherein the memory unit of the second hearing device comprises second setting data associated with user settings of the second hearing device, wherein the memory unit of the first hearing device comprises second setting backup data, and wherein the memory unit of the second hearing device comprises first setting backup data.

27 Claims, 6 Drawing Sheets

Fig. 4
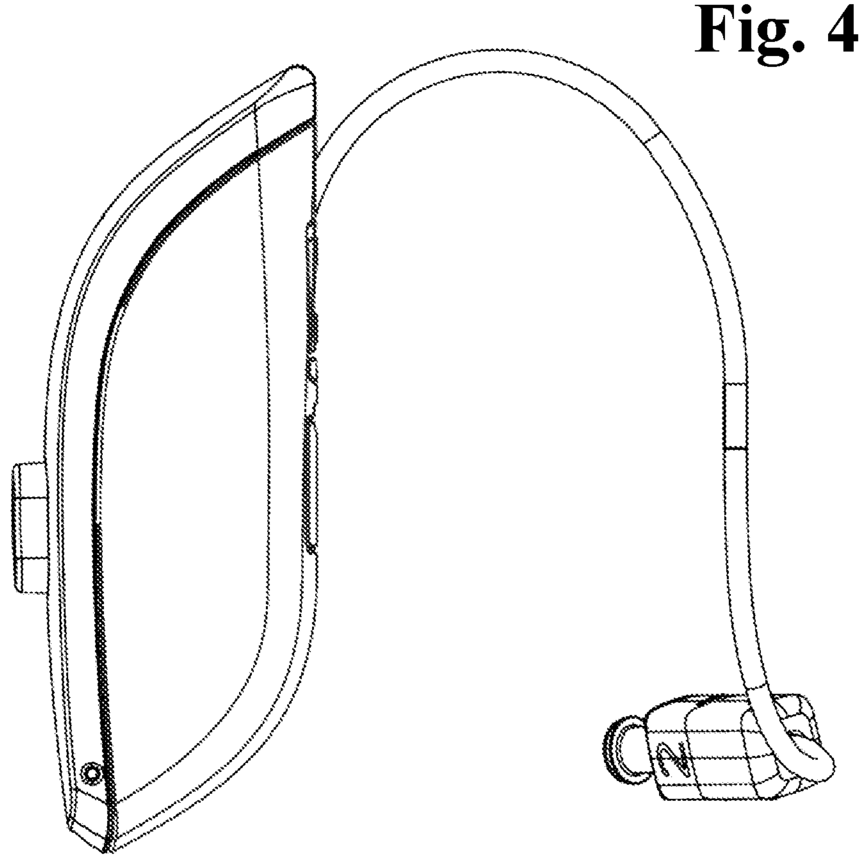
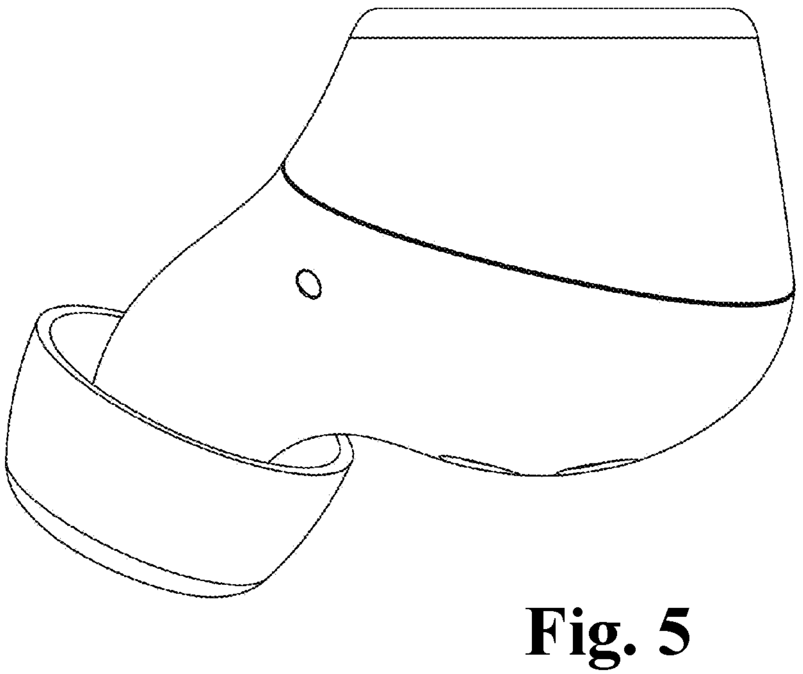
Fig. 5

SET OF HEARING DEVICES WITH MUTUAL SETTING BACKUP DATA

FIELD

The present disclosure relates to a set of hearing devices comprising mutual setting backup data, a method for providing setting backup data in a set of hearing devices, and a method for restoring settings in a set of hearing devices.

BACKGROUND

True wireless hearing devices, i.e., sets of hearing devices comprising a first hearing device adapted for being worn at a user's first ear and a second hearing device adapted for being worn at the user's second ear, wherein the hearing devices are wirelessly coupled to each other and to external devices, are becoming increasingly personalized and therefore has an increased number of user specific settings.

For hearing devices such as hearing aids, these have long included gain settings, which are frequency dependent on the user's personal hearing profile, so that the hearing devices could provide customized amplification in different frequency bands to compensate for the user's hearing deficit. This has recently also become a feature in hearing devices for the consumer segment.

For hearing aids, which are medical devices, setting up the hearing devices requires a hearing care professional, but for consumer hearing devices such settings are mostly performed by the users themselves, often with the aid of hearing test software. The result of these setups are personalized audiogram data, from which the gain for various frequency bands can be computed.

As the setup process can be time consuming, it is undesirable to have the user repeat the process in case the settings are lost, e.g., during malfunction or a disrupted update, or in case they have to replace a single hearing device, e.g., if lost or broken.

SUMMARY

Accordingly, there is a need to provide a set of hearing devices with increased redundancy.

A set of hearing devices is disclosed, the set of hearing devices comprising a first hearing device adapted to be worn at a first ear of a user and a second hearing device adapted to be worn at a second ear of the user, each of the first and second hearing devices comprising an output transducer, a wireless communication interface, a processing unit, and a memory unit, wherein the memory unit of the first hearing device comprises first setting data associated with user settings of the first hearing device, wherein the memory unit of the second hearing device comprises second setting data associated with user settings of the second hearing device, wherein the memory unit of the first hearing device comprises second setting backup data, and wherein the memory unit of the second hearing device comprises first setting backup data.

A method for proving backup data in a set of hearing devices is disclosed, wherein the set of hearing devices comprises a first hearing device adapted to be worn at a first ear of a user and a second hearing device adapted to be worn at a second ear of the user, each of the first and second hearing devices comprising an output transducer, a wireless communication interface, a processing unit, and a memory unit, the method comprising the steps of obtaining second setting data, obtaining first setting data, storing the second setting data in the memory unit of the first hearing device as first setting backup data, and storing the first setting data in the memory unit of the second hearing device as second setting backup data.

A method for restoring user settings in a set of hearing devices is disclosed, wherein the set of hearing devices comprises a first hearing device adapted to be worn at a first ear of a user and a second hearing device adapted to be worn at a second ear of the user, each of the first and second hearing devices comprising an output transducer, a wireless communication interface, a processing unit, and a memory unit, wherein the memory unit of the first hearing device comprises second setting backup data, and/or wherein the memory unit of the second hearing device comprises first setting backup data, the method comprising the steps of transferring second setting backup data from the first hearing device to the second hearing device, and/or transferring first setting backup data from the second hearing device to the first hearing device.

It is advantageous to provide the setting backup data of each hearing device in the memory unit of the opposite hearing device so that the settings may be restored in case one hearing device malfunctions and has to be replaced or if the local setting data of a hearing device becomes corrupted. Thereby, the user will not have to repeat a lengthy setup procedure to restore their customized settings. It is noted that the terms first and second ears are used to refer to the user's opposing ears, i.e., first being the left ear and second being the right or vice versa.

BRIEF DESCRIPTION OF THE DRAWINGS

The above and other features and advantages will become readily apparent to those skilled in the art by the following detailed description of exemplary embodiments thereof with reference to the attached drawings, in which:

FIG. 4 is a schematic drawing of a hearing device according to the disclosure, FIG. 5 is a schematic drawing of a hearing device according to the disclosure.

DETAILED DESCRIPTION

Figure 1:
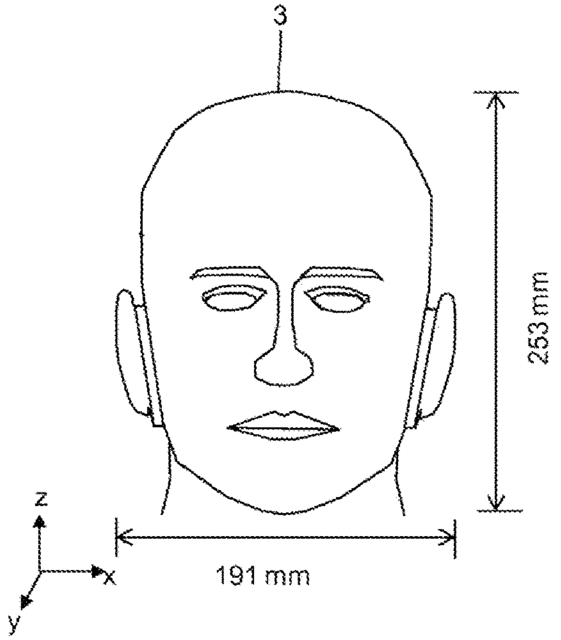
FIG. 1 schematically illustrates a head of a user.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments.

They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The hearing devices may be of the behind-the-ear (BTE) type, which comprises a BTE component for placement behind the ear, the BTE component having a speaker, an in-the-ear component for placement in the ear, and a hollow sound tube connecting the BTE and ITE components for transferring sound from the speaker to the ITE component. The hearing devices may be of the receiver-in-canal (RIC) type also known as receiver-in-the-ear (RITE) or receiver-in-ear (RIE), which comprises a BTE component for placement behind the ear, an in-the-ear component for placement in the ear, the ITE component having a speaker, and connector with one or more conducting wires connecting the BTE and ITE components for transferring electrical signals between the BTE and ITE components. The hearing devices may be of the in-the-ear (ITE) type, in-the-canal (ITC) type, completely in the canal (CIC) type, or a set of earbuds, which comprises an ITE component for placement at least partially in the ear canal, the ITE component having a speaker.

One or both of the hearing devices may be configured for wireless communication with one or more other devices, such as with one or more accessory devices, such as a smartphone and/or a smart watch. Each of the hearing devices comprises a primary antenna and/or a secondary antenna. Any of the antennas may be configured to convert one or more wireless input signals, e.g., a primary wireless input signal and/or a secondary wireless input signal, to antenna output signal(s). The wireless input signal(s) may originate from external source(s), such as spouse microphone device(s), wireless TV audio transmitter, and/or a distributed microphone array associated with a wireless transmitter. The wireless input signal(s) may origin from the other hearing device, and/or from one or more accessory devices.

Each of the hearing devices comprise a radio transceiver coupled to the respective hearing device's primary antenna and/or secondary antenna. The radio transceiver may be configured to convert the antenna output signal(s) to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

Each of the hearing devices may comprise a set of microphones. The set of microphones may comprise one or more microphones. The set of microphones comprises a primary microphone for provision of a primary microphone input signal and/or optionally a secondary microphone for provision of a secondary microphone input signal. The set of microphones may comprise N microphones for provision of N microphone input signal(s), wherein N is an integer in the range from 1 to 10. In one or more exemplary hearing devices, the number N of microphones is two, three, four, five or more. The set of microphones may comprise a tertiary microphone for provision of a tertiary microphone input signal. The set of microphones may comprise other vibration sensors, such as bone vibration sensors.

Each of the hearing devices comprise a processing unit for processing input signal(s), such as transceiver input signal(s) and/or microphone input signal(s). The processing unit is optionally configured to compensate for hearing loss of a user of the hearing device. The compensation may comprise amplifying sound signals in the transceiver input signal(s) and/or microphone input signal(s) by applying gain in one or more frequency bands according to the user's frequency dependent hearing loss. The processing unit may be connected to the radio transceiver for processing the transceiver input signal. The processing unit may be connected the first microphone for processing the first microphone input signal. The processing unit may be connected the second microphone if present for processing the second microphone input signal. The processing unit may comprise one or more A/D-converters for converting analog microphone input signal(s) to digital pre-processed microphone input signal(s).

The processing unit provides an electrical output signal based on the input signals to the processing unit. Input terminal(s) of the processing unit are optionally connected to respective output terminals of a pre-processing unit. For example, a transceiver input terminal of the processing unit may be connected to a transceiver output terminal of the transceiver. One or more microphone input terminals of the processing unit may be connected to respective one or more microphone output terminals of the one or more microphones.

The primary antenna may comprise a coil part coiled along a first antenna axis. The first antenna may be configured for magnetic induction communication, such as in a range of frequencies between 3 MHz and 100 MHz. The primary antenna may be configured for communication in a frequency band in the GHz range, such as at 5 GHZ, such as at 2.4 GHz. The primary antenna may be configured for providing a binaural wireless link between hearing devices located at opposite ears of the user. Optionally the primary antenna may also be configured for providing a wireless link with and external device, i.e., an electronic device other than the first and second hearing devices, such as a computer device, such as a smart device, such as a smart phone or smart watch.

The secondary antenna may be configured for communication in a frequency band in the GHz range, such as at 5 GHZ, such as at 2.4 GHZ, e.g., at Bluetooth frequencies. The secondary antenna may be configured for providing a wireless link with and external device, i.e., an electronic device other than the first and second hearing devices, such as a computer device, such as a smart device, such as a smart phone or smart watch, whilst the primary antenna provides the binaural wireless link between hearing devices.

The first setting data and backup data may comprise first audiogram data or first gain data, and/or the second setting data and backup data may comprise second audiogram data or second gain data. The first audiogram data and/or second audiogram data may represent results from a user's hearing test of the first ear and the second ear, respectively. The first audiogram data and/or second audiogram data may represent results from a user's computer assisted self-administered hearing test of the first ear and the second ear, respectively. The first gain data and/or second gain data may comprise one or more gain setting(s) derived from audiogram data.

The first audiogram data may comprise level data for two or more frequency values, preferably five or more frequency values, and/or the second audiogram data and/or second gain data comprises level data for two or more frequency values, preferably five or more frequency values. The two or more frequency values may be within the frequency range 20 HZ to 8000 Hz. Preferably, the first audiogram data and/or the second audiogram data comprise level data for two to four frequency values substantially equally distributed in the frequency range 300 Hz to 1200 Hz, e.g. level data for 500 Hz, 750 Hz, and 1000 Hz. Preferably, the first audiogram data and/or the second audiogram data comprise level data for two to four frequency values substantially equally distributed in the frequency range 800 Hz to 2200 Hz, e.g. level data for 1000 Hz, 1500 Hz, and 2000 Hz. Preferably, the first audiogram data and/or the second audiogram data comprise level data for two to six frequency values substantially equally distributed in the frequency range 1500 Hz to 6500 Hz, e.g. level data for 2000 Hz, 4000 Hz, 5000 Hz, and 6000 Hz. The level data will represent the user's level of hearing at the associated frequency value. The first and/or second hearing device(s) may be configured for calculating gain settings for frequency ranges corresponding to the frequency values, e.g., based on the NAL-NL2 prescription procedure, so that the hearing devices can compensate for the user's hearing loss.

The first audiogram data may be based on a first hearing test performed on the user's first ear using the first hearing device. The second audiogram data may be based on a second hearing test performed on the user's second ear using the second hearing device. The first and second hearing tests may be self-administered hearing test performed by the user assisted by a computing device, e.g., a smartphone. The first and second hearing tests may be Bayesian Pure-Tone Audiometry, BPTA, tests.

The first setting data and backup data may comprise first filter data, and/or the second setting data and backup data may comprise second filter data. The filter data may comprise user defined gain modification data representing the user's user preferences for gain modification in one or more frequency ranges, e.g., in the bass, mid, and treble ranges. In some instances, the user may prefer higher or lover gain in some frequency ranges, e.g., some users may prefer additional bass. The gain settings may be calculated based on both the audiogram data and the gain modification data, so as to both compensate for the user's hearing loss and meet their personal preferences.

The first setting data and backup data may comprise time stamp data, and/or the second setting data and backup data may comprise time stamp data. By including time stamp data, the first and/or second hearing device(s) may determine if the setting data or the setting backup data is synchronized or which of the setting data or the setting backup data is the more recent. If the setting data or the setting backup data is not synchronized, i.e., if the time stamps of the setting data or the setting backup data does not match, the set of hearing devices may initiate and update of the outdated of the setting data or the setting backup data, either automatically or by asking the user for permissions to update.

The first audiogram data and/or first gain data may be of the dictionary data type, and/or the second audiogram data and/or second gain data may be of the dictionary data type. Dictionary type data comprises key and value pairs, e.g., a frequency value and a corresponding audiogram level, preferably 8 or more key and value pairs including 8 different frequency values or ranges and corresponding audiogram levels or gain values, e.g.:

Audiogram.

left = [500, 35][750, 22][1000, 21][1500, 27][2000, 15][3000, 17][4000, 24][6000, 22];

Audiogram.

right = [500, 21][750, 25][1000, 23][1500, 16][2000, 19][3000, 25][4000, 25][6000, 25]

Wherein the key is a frequency in Hz, and the corresponding value represents an audiogram level corresponding to the user's hearing ability around the key frequency value. The key may be the centre frequency of a frequency sub-band. The key may be the starting frequency of a frequency sub-band, i.e., a frequency sub-band may extend from the frequency value of one key to the frequency value of the subsequent key, e.g., from 500 Hz to 750 Hz.

The processing unit of the first hearing device may be configured for validating first setting backup data received via the wireless interface of the first hearing device, and/or the processing unit of the second hearing device may be configured for validating second setting backup data received via the wireless interface of the second hearing device. Validating the received backup data may comprise one or more of the following steps: checking the size of the transferred backup data, checking the data type of the transferred backup data, or checking values of level settings in the transferred backup data against pre-set acceptable level thresholds.

FIG. 1 schematically illustrates a head of a user 3 with a first ear, e.g., the left ear, and a second ear, e.g., the right ear. As most people have varying hearing ability on their left and right ear it is advantageous to provide hearing devices which are customized to the particular ear, i.e., a first hearing device with custom settings for the user's hearing ability on their first ear, and a second hearing device with custom settings for the user's hearing ability on their second ear.

Figure 2:
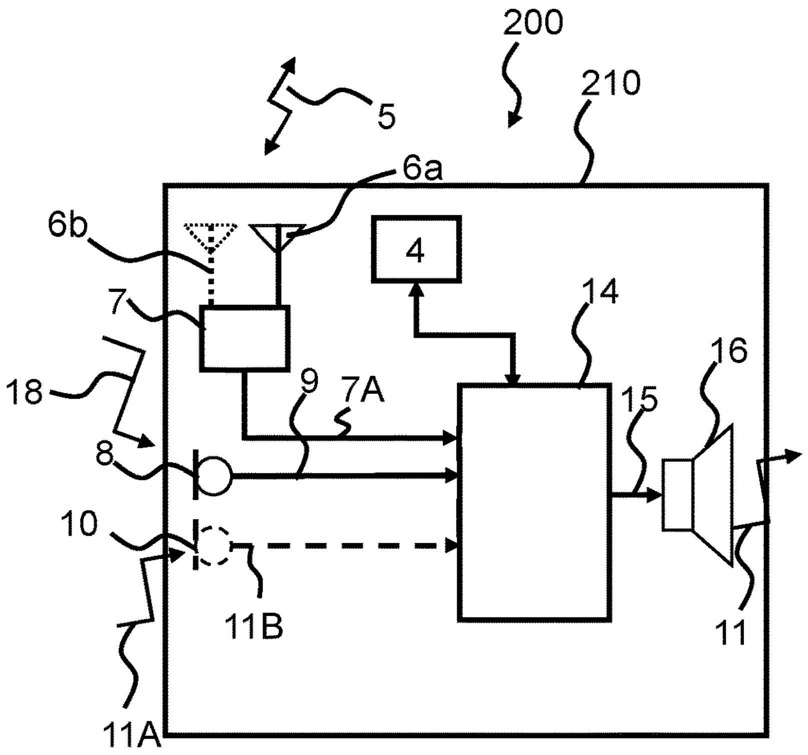
FIG. 2 is a block diagram of an exemplary hearing device according to the disclosure.

FIG. 2 is a block diagram of an exemplary hearing device 200, i.e., a first or second hearing device, according to the disclosure. The hearing device 200 comprises a set of microphones. The set of microphones comprises a primary microphone 8, such as a microphone configured to receive sounds from the environment outside the hearing device 200. The primary microphone 8 provides a primary microphone input signal 9 based a received audio signal 18. The set of microphones optionally comprises a secondary microphone 10, such as an ear canal microphone, for providing a secondary microphone input signal 11B, which is based on a received audio signal 11A.

The hearing device 200 may comprise an ear canal part and another part towards the opening of the ear. In one or more exemplary hearing devices, the secondary microphone 10 is positioned in the ear canal part of the hearing device 200, i.e., the part facing the ear drum or tympanic membrane) and the primary microphone 8 is positioned on the part of the hearing device 200 that faces the opening of the ear (capturing the environment).

The hearing device 200 comprises a casing 210 adapted to be worn at an ear of the user. The casing 210 may house one or more electrical and/or mechanical components of the hearing device 200, such as an output transducer 16, an input transducer 8, 10, a wireless interface, a processing unit 14, and a memory unit 4. A microphone inlet of the primary microphone 8 may be arranged at an outer surface of the casing 210. The microphone inlet of the primary microphone 8 may be configured to receive sounds from the environment outside the hearing device 200, e.g., by the inlet pf the primary microphone 8 being arranged at an outer surface of the casing 210 and facing towards the environment outside the hearing device 200. A microphone inlet of the secondary microphone 10 may be arranged at an outer surface of the casing 210. The microphone inlet of the secondary microphone 10 may be configured to receive sounds from the ear canal of the user wearing the hearing device 200, e.g., by the inlet of the secondary microphone 10 being arranged at an outer surface of the casing 210 and facing towards the ear canal of the user wearing the hearing device 200.

The hearing device 200 may comprise a wireless interface comprising a primary antenna 6*a* and optionally a secondary antenna 6*b* for converting received wireless signal(s) to antenna output signal(s). The primary antenna 6*a* is configured for establishing a wireless binaural link 5 with another hearing device at the user's other ear. The secondary antenna 6*b* is configured for establishing a wireless link with an external device other than the other hearing device, such as a smart device of computing device. In the shown embodiment the primary antenna 6*a* is a magnetic induction coil while the secondary antenna 6*b* is a radio frequency antenna for communication at 2.45 GHZ. The wireless interface may also be denoted as a wireless communication interface.

The hearing device 200 comprises a transceiver 7 coupled to the wireless interface for provision of a transceiver input signal 7A based on one or more antenna output signal(s). The transceiver 7 may be split into sub-units, wherein a respective sub-unit is coupled with one of the plurality of antennas.

The hearing device 200 comprises a processing unit 14 for processing input signal(s) and providing an output signal 15. The processing unit 14 is connected to the transceiver 7 for receiving and processing transceiver input signal(s). The processing unit 14 is connected to the microphones 8, 10 for receiving and processing the microphone input signal(s). The processing unit 14 is configured to compensate for a hearing loss of a user and to provide an output signal 15.

The processing of the transceiver and/or microphone input signal(s) is for some operations, e.g., compensation of hearing loss, performed according to custom settings stored in a memory unit 4 as setting data. The processing unit 14 is coupled to the memory unit 4 so that the processing unit 14 has access to the setting data.

The setting data comprises audiogram data or gain data. Wherein the audiogram data comprises information relating to the user's hearing ability, thus also the user's hearing loss, and the gain data comprises information about the amount of gain that the processing unit 14 should apply when processing in order to compensate for the user's hearing loss. The processing unit 14 may be configured to derive gain settings based on audiogram data.

The memory unit 4 of the hearing device 200 may be a short time/volatile memory such as a random access memory, and/or a cache memory. The memory unit 4 of the hearing device 200 may be a long time/non-volatile memory such as a read-only memory, and/or a flash memory.

The hearing device 200 comprises an output transducer in the form of a receiver 16, i.e., hearing aid terminology for a miniature loudspeaker, operatively coupled to the processing unit 14 so the receiver may receive the output signal 15 and convert the output signal 15 to an acoustic output signal 11. In some embodiments the output transducer may and antenna or implantable device, e.g., a cochlear implant.

The transceiver 7 may also receive signals from the processing unit 14 that are to be transmitted to the other hearing device or to an external device.

Figure 3:
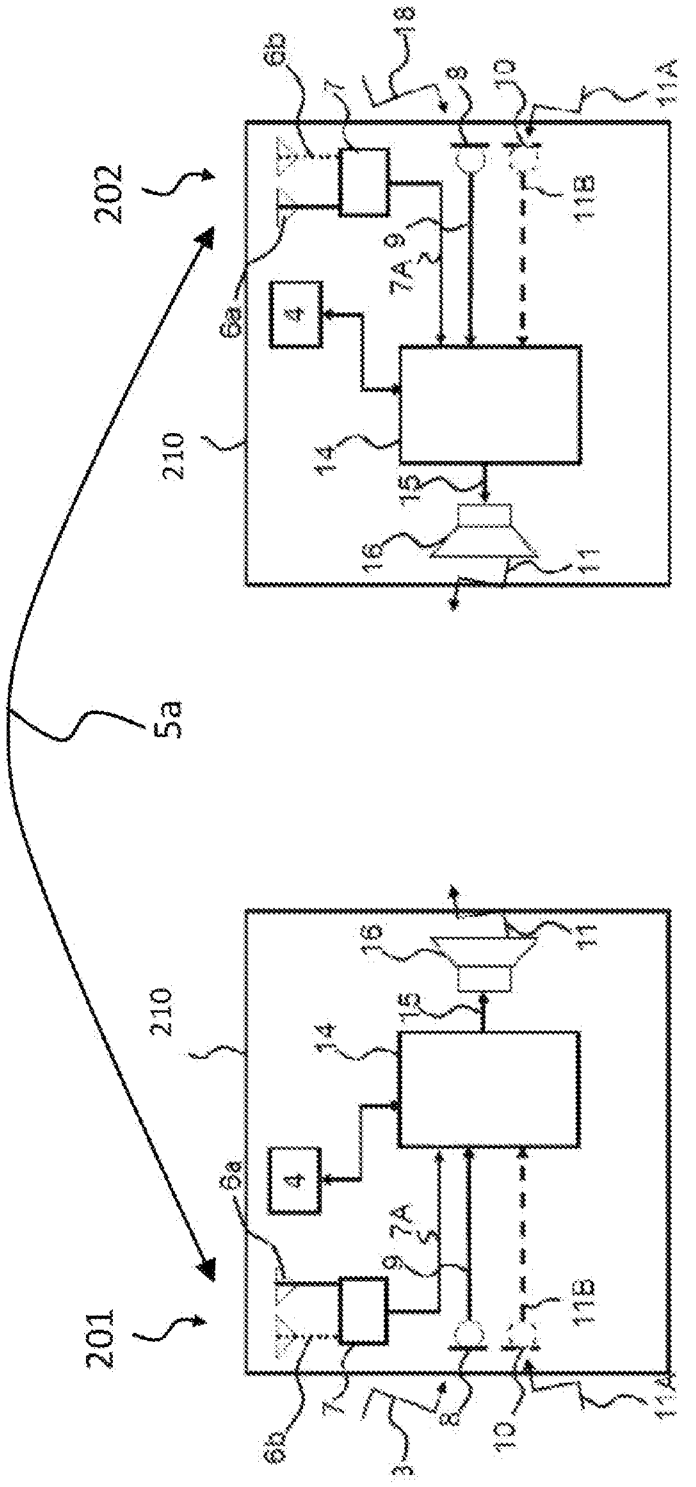
FIG. 3 is a block diagram of an exemplary set of hearing devices according to the disclosure.

FIG. 3 shows a schematical illustrations of a set of hearing devices like the ones shown in FIG. 2. The set of hearing devices comprises a first hearing device 201 configured to be worn at a user's first ear and a second hearing device 202 configured to be worn at the user's second ear. Each of the first and second hearing devices 201, 202 comprises the components described for FIG. 2. However, as mentioned above, hearing ability is often different from ear to ear so the first hearing device 201 is provided with first setting data relating to settings for the first ear while the second hearing device 202 is provided with second setting data relating to settings for the second ear, so that each of the hearing devices 201, 202 are customized for their respective ear.

According to some embodiments, the memory unit 4 of the first hearing device 201 comprises second setting backup data, wherein the second setting backup data is a backup of the second setting data. Likewise, the memory unit 4 of the second hearing device 202 comprises first setting backup data, wherein the first setting backup data is a backup of the first setting data.

Thereby, the set of hearing devices 201, 202 is provided with improved redundancy as either of the first and second setting data are backed up on the opposite hearing device. Should the first or second setting data be corrupted the corrupted setting data may be restored by initiating a transfer of setting backup data from the other hearing device, preferably using the binaural wireless link 5. Similarly, should one of the first or second hearing devices 201, 202 be lost or damaged, the user may save the time needed to re-customize the replacement hearing device, as the replacement may receive the backup data stored in the other hearing device.

FIG. 4 shows an exemplary embodiment of the first or second hearing device in the form of a hearing aid of the Receiver in Ear, RIE, type.

FIG. 5 shows an exemplary embodiment of the first or second hearing device in the form of an earbud.

Figure 6:
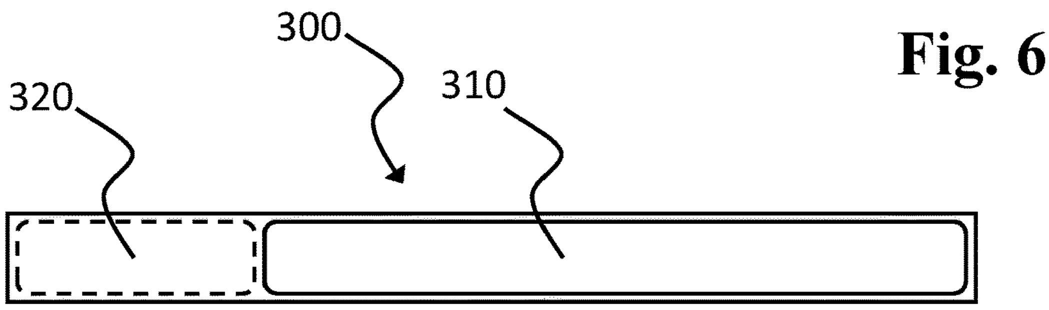
FIG. 6 is a block diagram of exemplary first or second setting data or first or second setting backup data.

FIG. 6 shows and example of a first or second setting data package and first or second setting backup data package. The data package 300 comprises audiogram and/or gain data 310, the audiogram data relating to the user's hearing ability and the gain data relating to how much gain should be applied by the processing unit to compensate for the user's hearing loss. The gain data is derived from audiogram data, and the audiogram data is derived from a hearing test of the user. Both the audiogram data and the gain data are preferably split into multiple frequency sub-bands, where each frequency sub-band is associated with an audiogram value, which represents the user's hearing ability in that frequency sub-band, and/or gain value, which represents how much gain should be applied by a processing unit in that frequency sub-band.

The first and second setting data package and the first and second setting backup data optionally comprise time stamp data 320 which indicates when the data was generated. This allows the set of hearing devices to compare the which of the setting data or setting backup data to check if the two are up to date with each other, and if not which of the two are the most current. As an example, the set of hearing devices may check the time stamp of the first setting backup data in the memory unit of the second hearing device against the time stamp of the first setting data in the memory unit of the first hearing device. If the time stamps show that the first setting backup data is outdated, the set of hearing devices may initiate a backup by transferring a copy of the first setting data to the second hearing device to replace the outdated first setting backup data. If the time stamps show that the first setting data is older than the first setting backup data, e.g., due to rollbacks, the set of hearing devices may initiate an update by transferring a copy of the first setting backup data in the first hearing device to the second hearing device to replace the outdated first setting data. Finally, if the time stamps are identical then both the setting data and the setting backup data are current, and no update/backup is needed.

Figure 7:
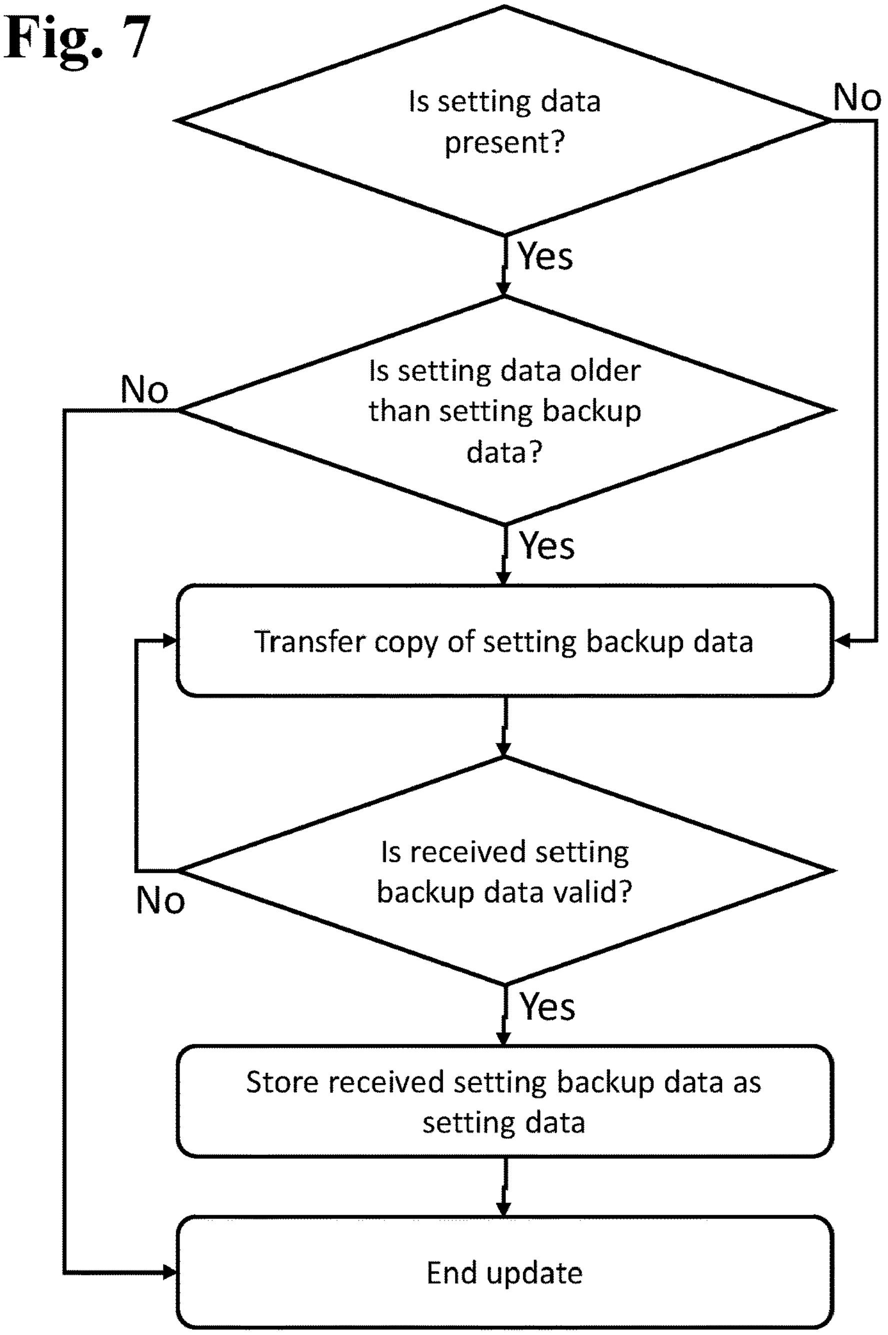
FIG. 7 is a flowchart illustrating the update/restoration process of setting data.

FIG. 7 shows a flow-chart of the backup process performed between the first and the second hearing devices 201, 202. An update/restoration of the setting data, i.e., the first setting data of the first hearing device 201 or the second setting data of the second hearing device 202, may be performed routinely and autonomously by the set of hearing devices or on request by the user. The flow chart of FIG. 7 will be described from the viewpoint of the first hearing device 201, but it will be equally applicable for the second hearing device 202 by reversing the described roles of the first and second hearing devices.

The update of the first setting data of the first hearing device 201 is initiated by a check by the processing unit 14 of the first hearing device 201 to check whether first setting data is present in the memory unit 4 of the first hearing device 201. If not, the first hearing device 201 will send a query for first setting backup data to the second hearing device 202. If on the other hand first setting data is present in the memory unit 4 of the first hearing device 201, the first hearing device 201 will send a query for first time stamp data of the first setting backup data to the second hearing device 202.

Upon receiving the time stamp time stamp data of the first setting backup data, the processing unit 14 of the first hearing device 201 will compare it with the time stamp data of the first setting data to check if the first setting data is current. If the comparison shows that the first setting data is newer or identical to the first setting backup data, the update process may end. In the case where the time stamp comparison indicates that the first setting data is newer than the first setting backup data, the set of hearing devices may initiate a backup by transferring the first setting data from the first hearing device 201 to the second hearing device 202, e.g., via the wireless link 5, after which the second hearing device 202 will store it in the memory unit 4 of the second hearing device 202 as first setting backup data to replace the outdated first setting backup data. If the comparison of the time stamp data shows that the first setting data is older than the first setting backup data, the first hearing device 201 will send a query for first setting backup data to the second hearing device 202.

Upon receiving the query for the first setting backup data, the second hearing device 202 will transfer a copy of the first setting backup data to the first hearing device 201. When receiving the copy of the first setting backup data, the first hearing device 201 performs a validation of the received data. The validation may comprise one or more of the following steps:

- checking the received first setting backup data for errors using error correction code,
- checking the size of the received first setting backup data,
- checking the data type of the received first setting backup data, or
- checking values of audiogram or gain level settings in the received first setting backup data against pre-set acceptable level thresholds.

If the first hearing device 201 cannot validate the received first setting backup data, the first hearing device 201 will delete it and send a new query for the first setting backup data to the second hearing device, whereby a new copy of the first setting backup data can be transmitted by the second hearing device 202, and the validation process repeated.

Once the first hearing device 201 receives first setting backup data which it can validate, it will proceed by storing it in the memory unit 4 as first setting data, and if present erasing outdated first setting data, whereby the first hearing device 201 is updated/restored with the most current first setting data.

The set of hearing devices may be configured for performing a user self-administered hearing test in order to obtain the first and/or second setting data, the first and/or second audiogram data, and/or the first and/or second gain data.

Figure 8:
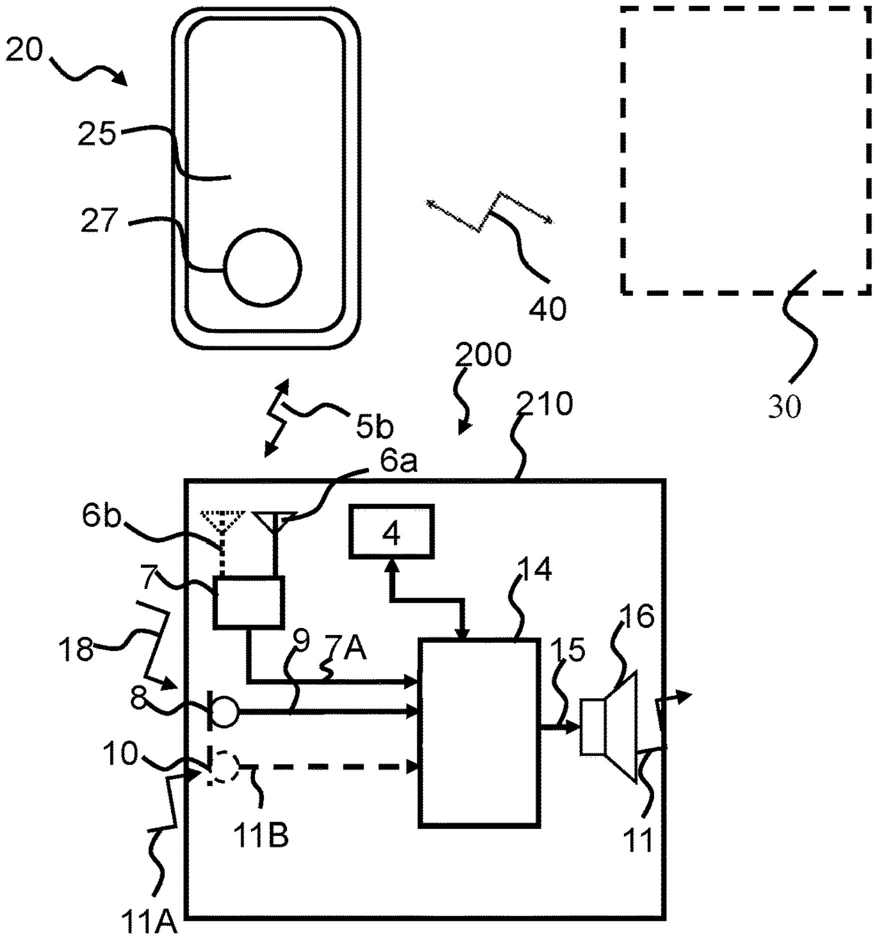
FIG. 8 illustrates a method carried out with a set of hearing devices and a smart device in accordance with some embodiments.

FIG. 8 is a schematic illustration of how the method of the present disclosure may be carried out using a hearing device 200 as described in FIG. 2 and a smart phone 20. It is noted that other external devices than a smart phone may be used, e.g., a computer or smart watch. To carry out the method of the present disclosure, the user will arrange the hearing device 200 in the ear which the hearing device 200 is adapted to be worn in, e.g., left or right, and connect the hearing device 200 to the smart phone 20, preferably via a wireless link **5*b***.

Figure 9:
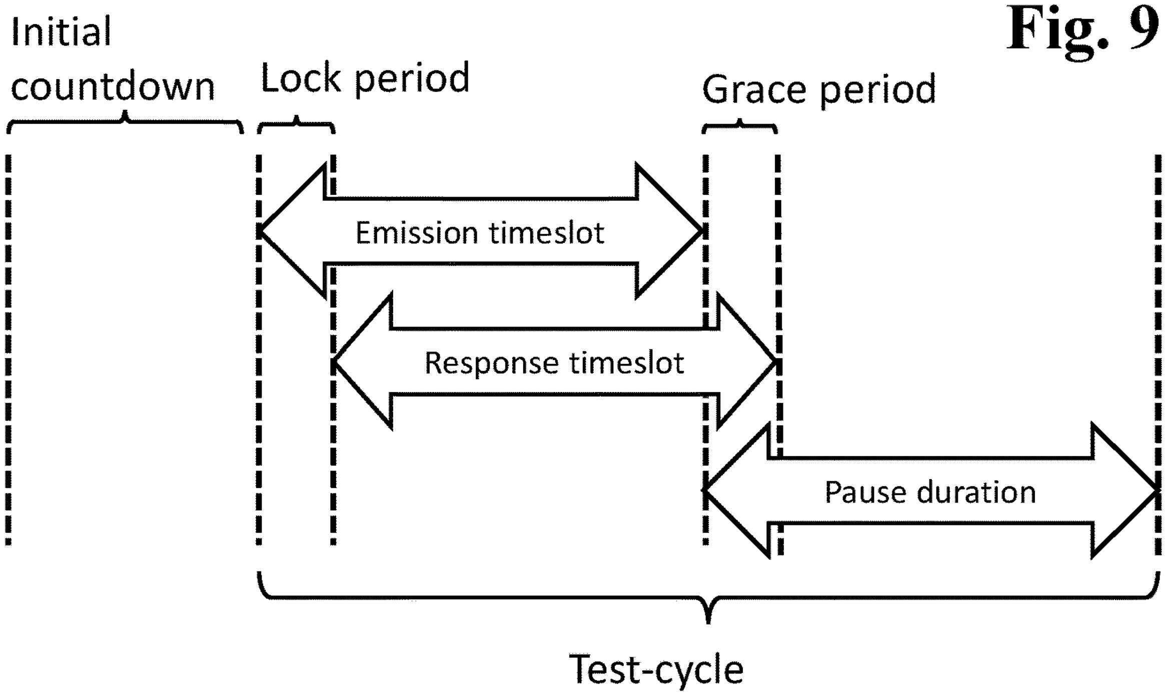
FIG. 9 is a chart showing the timeslots of a test-cycle of a self-administered hearing test according to the disclosure.

Once the smart phone 20 and the hearing device 200 are connected, the user may initiate the self-fitting hearing test using the interface of the smart phone 25, i.e., the touch screen. This will cause the smart phone to carry out a test-cycle as illustrated in FIG. 9. Said test-cycle comprising, in an emission timeslot, playing a test sound having a test volume, e.g., 20 dB, and a test frequency, e.g., 500 Hz, for the user through the receiver 16 of the hearing device 200.

Then, during a response timeslot which partially overlaps with the emission timeslot, a user response indicating whether the user heard the test sound is detected. In practice, this is done by having the user perform an action if they hear the test sound through the hearing device 200. The action could be to tap a virtual button 27 on the touch screen 25 of the smart phone 20 or simply tap the touch screen. On the other hand, if the user does not hear the test sound, then the user response that is detected will be an absence of the action, i.e., the lack of a tap. The response timeslot continues for a grace period after the emission timeslot is over, during which grace period user responses are still detected. The grace period allows the user to get their indication that they heard the test sound detected, even if they hesitate and miss responding while the test sound is playing.

At the end of the test cycle, the detected response, i.e., positive or negative depending on whether the user heard the test sound or not, as well at the test volume and test frequency of the completed test cycle is added to a test data set. Another test cycle may then be repeated for another test volume and/or test frequency, and this process is repeated until sufficient data has been gathered. The user response, test volume, and test frequency for each test-cycle is added to the test data set.

Audiogram data is now calculated based on the test data set. This calculation is either done by a processor of the smart phone 20 or by the processing unit 14 of the hearing device 200. Finally, the audiogram data is outputted and added to setting data stored in the memory unit 4 of the hearing device 200. If there are two hearing devices 201, 202, i.e., a set of hearing devices, then the setting data is also stored in the memory unit 4 of the other hearing device as setting backup data. If there are two hearing devices 201, 202, the self-fitting hearing test may be repeated as described above for the other hearing device.

Before the first test-cycle, there may be an initial count-down, e.g., in the form of an acoustic signal played to the user via the receiver 16, to prepare the user and inform them that the test is about to begin. Each test-cycle may comprise a pause duration to separate the emission timeslot of one test-cycle from that of the subsequent.

It is noted that the method may be carried out aided by a server device 30 connected to the external device via a network 40, e.g., the internet. Optionally, the server may assist or perform the step of calculating the audiogram data.

Figure 10:
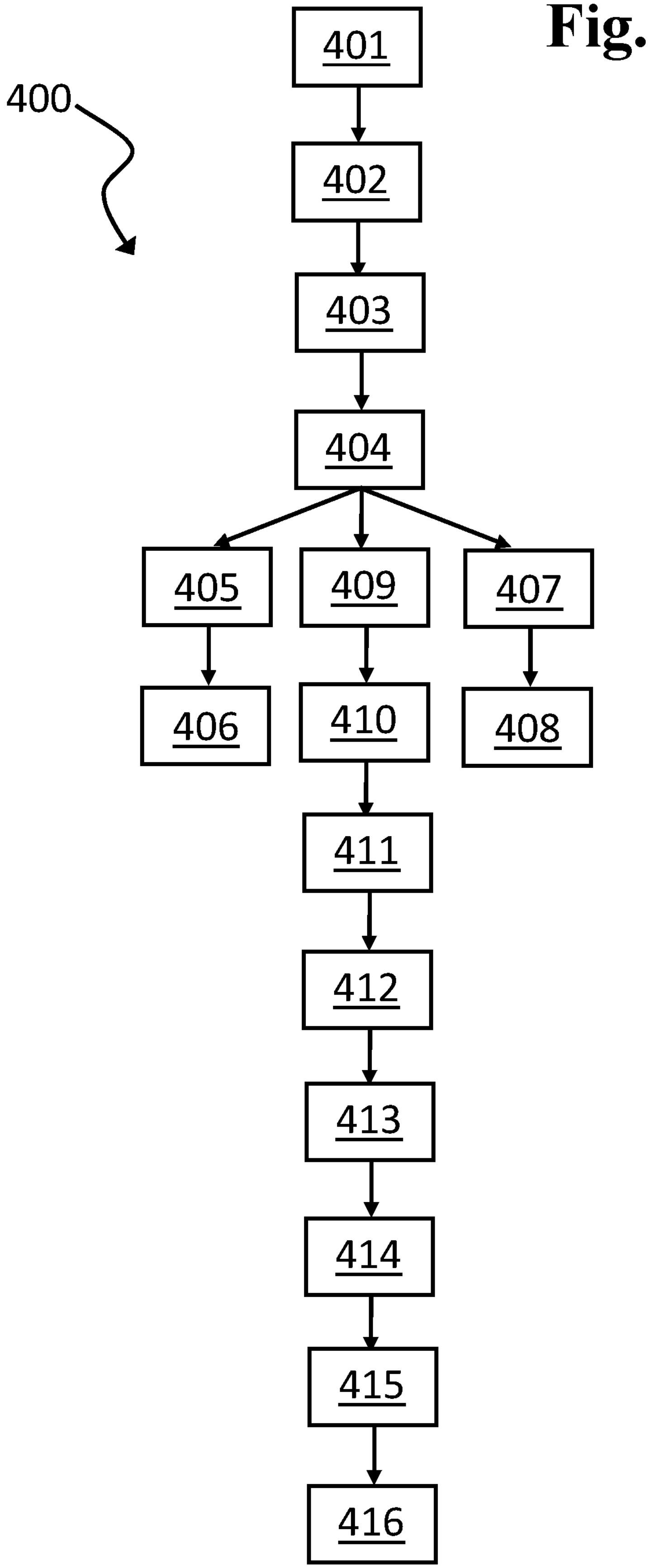
FIG. 10 shows a flow-chart of a method of determining ambient noise during a self-administered hearing test.

FIG. 10 shows a flow-chart of a method 400 of determining ambient noise during such a self-administered hearing test. The method comprises the step of performing 401 via the first hearing device 201 a first hearing test on the first ear of the user. The method comprises the step of, while performing the first hearing test, obtaining 402 via the second hearing device 202 a second input signal. The second input signal being indicative of ambient noise. The second input signal may be obtained by the primary microphone 8 of the second hearing device 202, and/or the second input signal may be obtained by the secondary microphone 8 of the second hearing device 202. The method comprises the step of, based on the second input signal, determining 403 a first ambient noise level. The step of determining the first ambient noise may be performed by a processing unit 14 of the second hearing device 202. Determining of the first ambient noise may be performed by transmitting the obtained second input signal to an external device, such as a smart device. The smart device may then determine the ambient noise level based on the received second input signal. Determining of the ambient noise level may comprise determining a magnitude or amplitude of the second input signal. The method comprises the step of outputting 404 the first ambient noise level. Outputting the first ambient noise level may comprise generating a user notification notifying the user regarding the first ambient noise level, such as outputting a level of the ambient noise to the user. Outputting the first ambient noise level may comprise outputting the determined first ambient noise level for further processing. Further processing may be carried out by a processing unit of the second hearing device 202, or by a smart device communicatively connected to the second hearing device 202. The method comprises the step of comparing 405 the first ambient noise level to a first noise threshold. The method comprises the step of, if the first ambient noise level exceeds the first noise threshold, outputting 406 a user notification. The user notification may be outputted as an audible message to the user via the output transducer of either or both hearing devices 201, 202. The user notification may be outputted on a smart device communicatively connected to the second hearing device 202, e.g., as a readable message on a display of the smart device. The method comprises the step of comparing 407 the first ambient noise level to a second noise threshold. The second noise threshold may differ from the first noise threshold. The second noise threshold may have a higher threshold value, so during a hearing test the user is first notified, and then the test is stopped. The method comprises the step of, if the first ambient noise level exceeds the second noise threshold, stopping 408 the first hearing test. Stopping the hearing test may be associated with a user notification, informing the user that the ambient noise level is too high to conduct a hearing test. The method comprises the step of, subsequently to performing the first hearing test, performing 409 via the second hearing device 202 a second hearing test on the second ear of the user. The method comprises the step of, while performing the second hearing test, obtaining 410 via the first hearing device 201 a first input signal. The first input signal being indicative of ambient noise. The method comprises the step of, based on the first input signal, determining 411 a second ambient noise level. The method comprises the step of outputting 412 the second ambient noise level. Outputting the second ambient noise level may comprise generating a user notification notifying the user regarding the second ambient noise level, such as outputting a level of the ambient noise to the user. Outputting the second ambient noise level may comprise outputting the determined second ambient noise level for further processing. The second ambient noise level may also be compared to the first and/or the second noise threshold. The method comprises the step of comparing 413 the second ambient noise level to the second noise threshold. The method comprises the step of, if the first ambient noise level exceeds the second noise threshold, stopping 414 the second hearing test and storing the result of the first hearing test. Storing of the result of the first hearing test may happen in a non-volatile memory 4 of the first hearing device 201 and/or the second hearing device 202. The method comprises the step of, if the user reinitiates the hearing test after having been stopped during the second hearing test performing 415 via the second hearing device 202 the second hearing test on the second ear of the user. The method comprises the step of determining 416 a hearing profile based on the stored result of the first hearing test and the result of the second hearing test.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that the figures comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES

3 head of a user
4 memory unit
5*a* wireless link between first and second hearing devices
5*b* wireless link between hearing device and external device
6*a* primary antenna
6*b* secondary antenna
7 radio transceiver
7*a* transceiver input signal
8 primary microphone
9 primary microphone input signal
10 secondary microphone
11 acoustic output signal
11*a* acoustic input signal
11*b* secondary microphone input signal
14 processing unit
15 output signal
16 receiver
18 acoustic input signal
20 external device, smart phone
25 user interface
27 virtual button
30 server device
40 link between external device and server device
200 hearing device
201 first hearing device
202 second hearing device
210 casing
300 first setting data, second setting data, first setting backup data, or second setting backup data
310 first audiogram data, first gain data, second audiogram data, or second gain data
320 first or second time stamp data
400 method for determining ambient noise during a self-administered hearing test
401 step of performing a first hearing test on the first ear of the user
402 step of obtaining a second input signal
403 step of determining a first ambient noise level
404 step of outputting the first ambient noise level
405 step of comparing the first ambient noise level to a first noise threshold
406 step of outputting a user notification
407 step of comparing the first ambient noise level to a second noise threshold
408 step of stopping the first hearing test
409 step of performing a second hearing test on the second ear of the user
410 step of obtaining a first input signal
411 step of determining a second ambient noise level
412 step of outputting the second ambient noise level
413 step of comparing the second ambient noise level to the second noise threshold
414 step of stopping the second hearing test and storing the result of the first hearing test
415 step of performing via the second hearing device the second hearing test on the second ear of the user
416 step of determining a hearing profile based on the stored result of the first hearing test and the result of the second hearing test

The invention claimed is:

1. A set of hearing devices comprising:
a first hearing device configured to be worn at a first ear of a user; and
a second hearing device configured to be worn at a second ear of the user;
wherein each of the first and second hearing devices comprises:
an output transducer,
a wireless communication interface,
a processing unit, and
a memory unit;
wherein the memory unit of the first hearing device comprises first setting data for the first hearing device;
wherein the memory unit of the second hearing device comprises second setting data for the second hearing device;
wherein the memory unit of the second hearing device also comprises first setting backup data for the first hearing device;
wherein the memory unit of the first hearing device also comprises second setting backup data for the second hearing device; and
wherein the processing unit of the first hearing device is configured to validate the first setting backup data, and/or wherein the processing unit of the second hearing device is configured to validate the second setting backup data.

2. The set of hearing devices of claim 1, wherein the first setting data and the first setting backup data comprise first audiogram data and/or first gain data; and/or
wherein the second setting data and the second setting backup data comprise second audiogram data and/or second gain data.

3. The set of hearing devices of claim 2, wherein the first audiogram data and/or first gain data is of a dictionary data type; and/or
wherein the second audiogram data and/or second gain data is of the dictionary data type.

4. The set of hearing devices of claim 2, wherein the first audiogram data comprises audiogram level values for two or more frequency values.

5. The set of hearing devices of claim 2, wherein the second audiogram data comprises audiogram level values for two or more frequency values.

6. The set of hearing devices of claim 1, wherein the first setting data and the first setting backup data comprise first filter data, and/or wherein the second setting data and the second setting backup data comprise second filter data.

7. The set of hearing devices of claim 1, wherein the first setting data and the first setting backup data comprise first time stamp data, and/or wherein the second setting data and the second setting backup data comprise second time stamp data.

8. The set of hearing devices of claim 1, wherein the wireless communication interface of the second hearing device is configured to transmit the first setting backup data to the first hearing device; and/or wherein the wireless communication interface of the first hearing device is configured to transmit the second setting backup data to the second hearing device.

9. The set of hearing devices of claim 1, wherein the first setting backup data is backup of the first setting data, and wherein the second setting backup data is backup of the second setting data.

10. A method performed by a set of hearing devices, the set of hearing devices comprising a first hearing device configured to be worn at a first ear of a user and a second hearing device configured to be worn at a second ear of the user, each of the first and second hearing devices comprising an output transducer, a wireless communication interface, a processing unit, and a memory unit, the method comprising:

obtaining first setting data for the first hearing device;

obtaining second setting data for the second hearing device;

storing the first setting data in the memory unit of the second hearing device as first setting backup data for the first hearing device;

storing the second setting data in the memory unit of the first hearing device as second setting backup data for the second hearing device; and validating the first setting backup data, and/or validating the second setting backup data.

11. The method of claim 10, wherein the first setting data and first setting backup data comprise first audiogram data and/or first gain data; and/or wherein the second setting data and second setting backup data comprise second audiogram data and/or second gain data.

12. The method of claim 11, wherein the first audiogram data and/or first gain data is of a dictionary data type; and/or wherein the second audiogram data and/or second gain data is of the dictionary data type.

13. The method of claim 11, wherein the first audiogram data and/or the second audiogram data comprises audiogram level values for two or more frequency values.

14. The method of claim 10, wherein the first setting data and first setting backup data comprise first filter data; and/or wherein the second setting data and second setting backup data comprise second filter data.

15. The method of claim 10, wherein the first setting data and first setting backup data comprise first time stamp data, and/or wherein the second setting data and second setting backup data comprise second time stamp data.

16. A product having a non-transitory medium, the non-transitory medium storing a set of instructions, wherein an execution of the instructions will cause the method of claim 10 to be performed.

17. A method performed by a set of hearing devices, the set of hearing devices comprising a first hearing device configured to be worn at a first ear of a user and a second hearing device configured to be worn at a second ear of the user, each of the first and second hearing devices comprising an output transducer, a wireless communication interface, a processing unit, and a memory unit, wherein the memory unit of the second hearing device comprises first setting backup data for the first hearing device and/or wherein the memory unit of the first hearing device comprises second setting backup data for the second hearing device, the method comprising:

transmitting the second setting backup data from the first hearing device to the second hearing device, and/or transmitting the first setting backup data from the second hearing device to the first hearing device;

wherein the method further comprises validating the transmitted first setting backup data, and/or validating the transmitted second setting backup data.

18. The method of claim 17, wherein the first setting backup data comprises first audiogram data and/or first gain data; and/or wherein the second setting backup data comprises second audiogram data and/or second gain data.

19. The method of claim 18, wherein the first audiogram data and/or first gain data are of a dictionary data type; and/or wherein the second audiogram data and/or second gain data are of the dictionary data type.

20. The method of claim 18, wherein the first audiogram data and/or the second audiogram data comprises audiogram level values for two or more frequency values.

21. The method of claim 17, wherein the first setting backup data comprises first filter data; and/or wherein the second setting backup data comprises second filter data.

22. The method of claim 17, wherein the first setting backup data comprises first time stamp data; and/or wherein the second setting backup data comprises second time stamp data.

23. The method of claim 17, wherein the act of validating the transmitted first setting backup data comprises:

checking a size of the first setting backup data, checking data type of the first setting backup data, checking values of level settings in the first setting backup data against pre-set acceptable level thresholds, or any combination of the foregoing.

24. The method of claim 17, wherein the act of validating the transmitted second setting backup data comprises:

checking a size of the first setting backup data, checking data type of the first setting backup data, checking values of level settings in the first setting backup data against pre-set acceptable level thresholds, or any combination of the foregoing.

25. The method of claim 17, further comprising comparing a time stamp data of the first setting backup data with a time stamp data of the first setting data in the first hearing device;

wherein the first setting backup data is transmitted from the second hearing device to the first hearing device if the time stamp data of the first setting backup data is the more recent than the time stamp data of the first setting data.

26. The method of claim 17, further comprising comparing a time stamp data of the second setting backup data with a time stamp data of the second setting data in the second hearing device;

wherein the second setting backup data is transmitted from the first hearing device to the second hearing device if the time stamp data of the second setting backup data is the more recent than the time stamp data of the second setting data.

27. A product having a non-transitory medium, the non-transitory medium storing a set of instructions, wherein an execution of the instructions will cause the method of claim 17 to be performed.

* * * * *